(12) United States Patent
Cronk

(10) Patent No.: US 6,783,263 B1
(45) Date of Patent: Aug. 31, 2004

(54) ADJUSTABLE REFLECTOR DEVICE

(76) Inventor: Paul Andrew Cronk, Unit 1 65 Evans Street, Harbord, NSW (AU), 2096

( * ) Notice: Subject to any disclaimer, the term of this patent is extended or adjusted under 35 U.S.C. 154(b) by 0 days.

(21) Appl. No.: 09/548,862

(22) Filed: Apr. 13, 2000

Related U.S. Application Data

(63) Continuation-in-part of application No. 08/952,628, filed on Mar. 10, 1998, now Pat. No. 6,053,624.

(51) Int. Cl.$^7$ ................................................. F21V 7/00
(52) U.S. Cl. ...................... 362/347; 362/263; 362/264; 362/345; 362/301; 362/294
(58) Field of Search ................................. 362/347, 263, 362/264, 345, 301, 294

(56) References Cited

U.S. PATENT DOCUMENTS

| | | | | |
|---|---|---|---|---|
| 3,099,403 A | * | 7/1963 | Strawick ...................... 362/347 |
| 4,150,422 A | * | 4/1979 | Peralta et al. ................ 362/218 |
| 4,665,472 A | * | 5/1987 | Chang ......................... 362/294 |
| 5,249,110 A | * | 9/1993 | Russello et al. ............. 362/294 |
| 5,711,218 A | * | 1/1998 | Kikuchi ....................... 362/301 |
| 6,053,624 A | * | 4/2000 | Cronk .......................... 362/347 |
| 6,200,007 B1 | * | 3/2001 | Minissi et al. ............... 362/373 |

FOREIGN PATENT DOCUMENTS

| JP | 1992-23001 | 2/1992 |
|---|---|---|
| JP | 1994-60915 | 8/1994 |

* cited by examiner

*Primary Examiner*—Stephen Husar
*Assistant Examiner*—Anabel Ton
(74) *Attorney, Agent, or Firm*—Cesari and McKenna, LLP

(57) ABSTRACT

An adjustable reflector device is disclosed. The device consists of an adjustable double parabolic reflective skin with an adjustable lamp mount, incorporating a V-shaped perforated heat shield, attached. The two part reflective skin forms a double parabolic shape when flexed back against a reinforced spine. This flexible shape is secured by lengthwise adjustable chain retainers attached a both ends of the skin. The lamp mount slides onto a pair of threaded bolts secured to the skin and adjustment is achieved by tightening or loosening the appropriate nuts. The heat shield slides onto the lamp fitting and is positioned appropriately to deflect incident heat and light. This device can be used to provide variable conditions of artificial illumination.

12 Claims, 4 Drawing Sheets

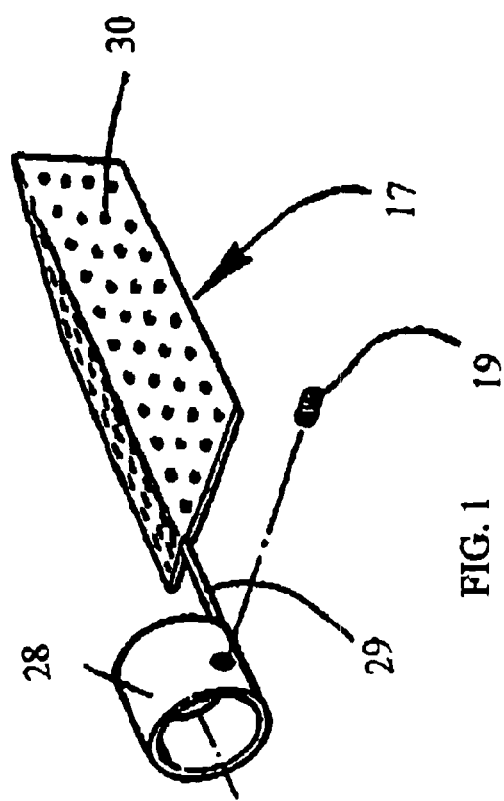
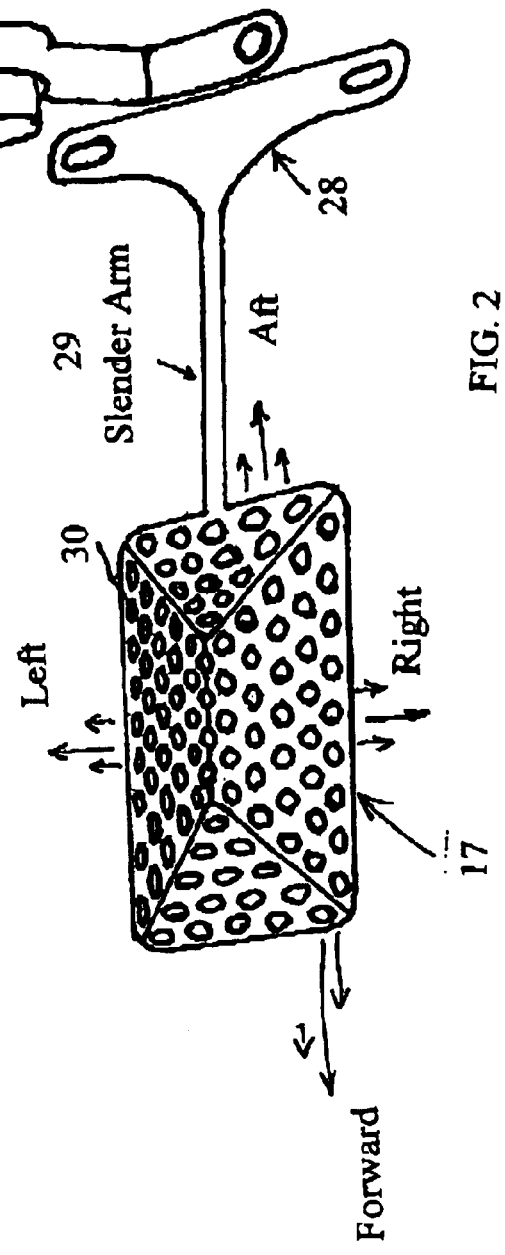
FIG. 1
FIG. 2

*I = Incident light
*R = Reflected light

*I = Incident light passing through heat shield perforations
*R = Reflected light by the heat shield

US 6,783,263 B1

ADJUSTABLE REFLECTOR DEVICE

RELATED APPLICATION

This application is a continuation-in-part of Ser. No. 08/952,628, filed Mar. 10, 1998, now U.S. Pat. No. 6,053,624.

BACKGROUND OF THE INVENTION

This invention relates to improvements in devices for reflecting light emitted by artificial sources.

DESCRIPTION OF THE PRIOR ART

Modern industrial requirements for artificial lighting are extensive, varied, and constantly expanding.

Many types of reflector devices associated with artificial illumination of industrial spaces are currently known, but these generally require that a fixed shape and/or a fixed lamp mounting position within that shape be precisely specified to create optimal light distribution for a particular purpose. For example, a 'chinaman hat' reflector might commonly be used in a situation where a wide, uniform spread of light is required. In this case, the spreading of light is largely dependent on the fixed internal angle of the cone shaped 'chinahat' reflector. The uniformity of light emitted is therefore largely dependent on the non-adjustable lamp positioning within that reflector. These known devices have the disadvantage that their rigid, non-adjustable, designs limit their efficient use to a relatively small range of applications.

The Applicant's related U.S. Pat. No. 6,053,624 (and foreign equivalents) relates to a novel reflector having adjustable curvature, which overcomes such disadvantages of the prior art.

Horizontally mounted lamps coupled with appropriate reflectors, such as defined in the aforementioned patent, are popular and fulfill industrial requirements in most cases; however, their efficiency is limited. The closer these fitting can be placed to the 'target area' the better the overall efficiency and the greater the intensity. However, there comes a point where the intensity and heat of the light beam directly below the lamp (focal hot spot) limits closer placement. In these conditions, addition of a 'heat shield' (as outlined below) can help redistribute excess light and heat from the 'hot spot' to other areas below the reflector thereby, dramatically increasing uniformity, functionality and efficiency in these extreme applications. This heat shield is superior to the prior art because it relies only on direct reflection toward a target area below the lighting fixture. It does not reflect substantial quantities of radiation back towards the lamp and reflector for (inefficient) re-reflection. Hence, the function of the heat shield is totally separable from that of the reflector it is coupled with, not limiting it to use in conjunction with any specific reflector design.

SUMMARY OF THE INVENTION

The present invention seeks to provide an adjustable reflecting device which substantially or at least ameliorates the disadvantages of the prior art.

According to a first aspect of the present invention there is disclosed a light fitting comprising a lamp receiving fixture having first and second opposite sides, and a reflector means, the reflector means being mounted to said first side of the lamp receiving fixture to produce a beam of light from said light fitting when said lamp receiving fixture contains an illuminated lamp, wherein said light fitting also includes a heat shield mounted to said second side of said lamp receiving fixture and in said beam of light, said heat shield having at least one surface facing said reflector means and directly receiving light from said lamp incident on said surface, each said surface being angled relative to said lamp receiving fixture to prevent light from said lamp being reflected towards said lamp and reflector means, and also having a plurality of apertures therein through which some of the light emitted by said lamp can pass.

According to a second aspect of the present invention there is disclosed a method of shielding a beam generated from a light fitting comprising a lamp receiving fixture having first and second opposite sides and a reflector means, the reflector means being mounted to said first side of the lamp receiving fixture to produce said beam from said light fitting when said lamp receiving fixture contains an illuminated lamp, said method comprising the step of mounting a heat shield to said second side of said lamp receiving fixture and in said beam of light, said heat shield having at least one surface facing said reflector and directly receiving light from said lamp incident on said surface, each said surface being angled relative to said lamp receiving fixture to prevent light from said lamp being reflected towards said lamp and reflector means, and also having a plurality of apertures therein through which some of the light emitted by said lamp can pass.

BRIEF DESCRIPTION OF THE DRAWINGS

The present invention will become more fully understood from the following description of a preferred but non-limiting embodiment thereof, described in connection with the accompanying drawings, wherein:

FIG. 1 shows a preferred embodiment of the shielding device in accordance with the present invention;

FIG. 2 shows an alternatively preferred embodiment of the shielding device of the invention;

DETAILED DESCRIPTION OF AN ILLUSTRATIVE EMBODIMENT

Throughout the drawings, like numerals will be utilized to represent similar features, except when expressly otherwise indicated.

Figure 3:
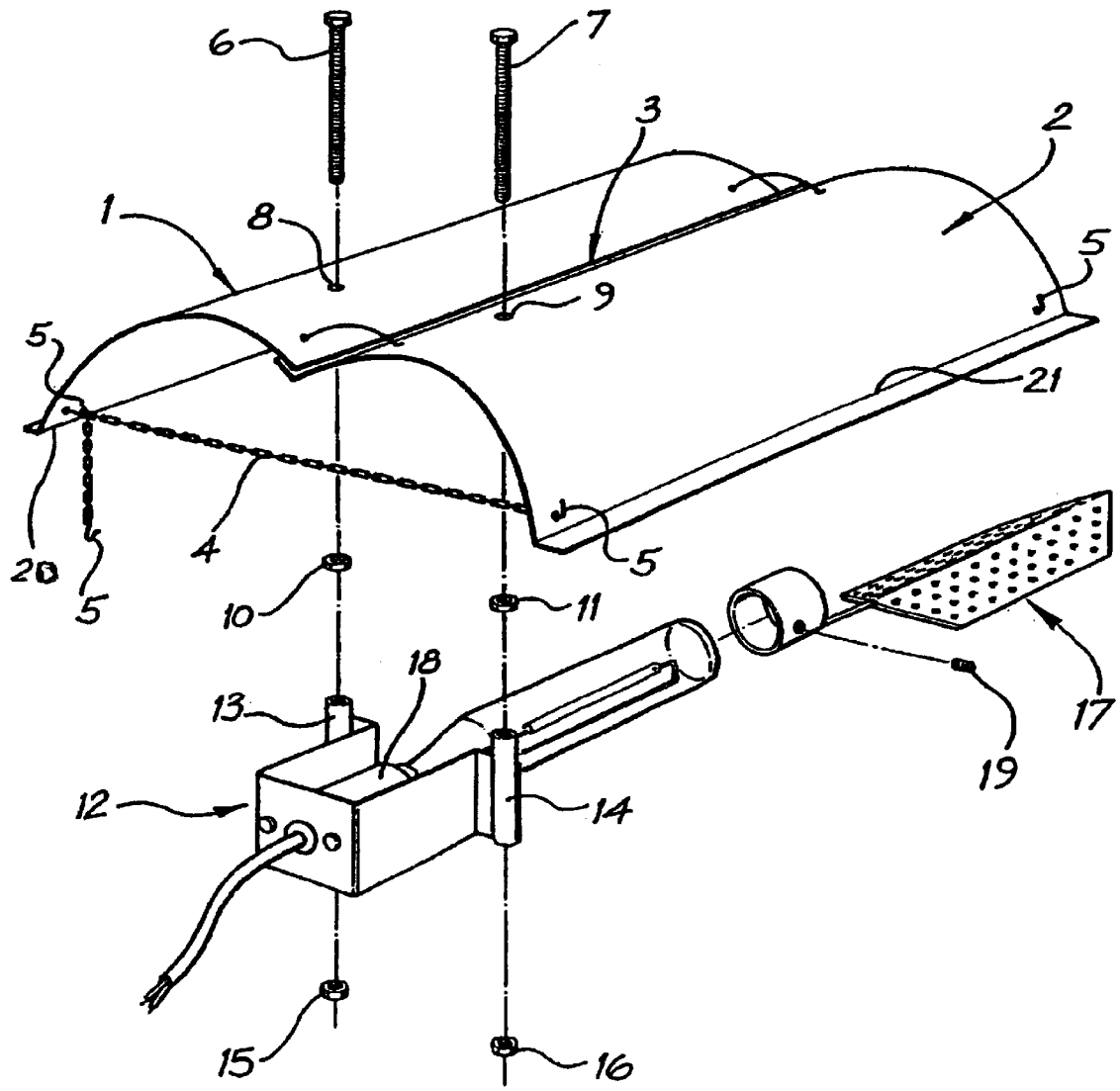
FIG. 3 shows an exploded view of one example of an adjustable reflector device used in conjunction with the shielding device of the present invention.

Also, throughout the specification, the term "a double parabolic" is utilized to describe the shape of a reflector device when it is in its flexed position, and retained against the bias of its normal resilience, as for example, as shown in FIG. 3 of the drawings. In considering this definition, it should be appreciated that any size, shape or width of double parabolic or similar shape should be considered to fall within the scope of this definition.

The present invention provides a shielding device, which is substantially V-shaped and perforated, and which is used in association with a reflector device. A preferred arrangement of a reflector device which may be used, is an adjustable light reflector device having a resilient reflective sheet, flexed to form a double parabolic shape, which is held in place against its resiliency by adjustable retainers located at each end of the sheet and an independently adjustable lamp mount which attaches to the sheet when it is in the retained position.

Referring to FIG. 1, there is shown a shielding device 17, which is generally V-shaped, which may be attached to a lamp fitting or lamp socket 18 (FIG. 3) by means of an attachment means 28. The attachment means 28 is shown embodied as a cylindrical sleeve, which may be secured by a grub screw 19 to the lamp fitting or lamp socket. An arm 29 connects the attachment means 28 to the shielding device 17. The shielding device 17 is provided with perforations 30, which will allow the transmission of some radiant emissions therethrough, while other radiant emissions will be reflected by the surface of the shielding device, as will be further detailed hereinafter. The sizing, patterning, etc., of the perforations will control the amount of radiation which is transmitted past the device 17, through the perforations 30, and that which is reflected by the device 17, and can thus be predetermined depending upon the amount of radiation required according to the application, the type of reflector used, etc.

Referring to FIG. 2, is shown an alternative, but also preferred, embodiment of the invention. In the embodiment of FIG. 2, the reflector may also be described as V-shaped, but its ends are also pitched, somewhat resembling a single gable, double hipped 'house-roof' shape. The shielding device 17 of FIG. 2 will disperse light and heat in four different directions from the 'hot spot'. That is, the radiation will be reflected left, right, forward and behind the emission source. The embodiment of FIG. 2 also shows an alternative embodiment of an attachment means 28, in this case, the attachment means 28 includes a bolt-on-bracket arrangement.

Referring to FIG. 3 it can be seen that a preferred embodiment of adjustable reflector device used in conjunction with the shielding device of this invention includes a two piece resilient sheet formed by two sheet members 1 and 2, having protruding skirts 25 and 27 parallel with the longer edges thereof. The sheet members 1 and 2 are each substantially rectangularly shaped, detachably joined about a spine portion 3 and then flexed back against their normal resilience to produce a double parabolic shape, as shown. Thus, one edge and associated skirt, e.g., skirt 25, of one sheet member fits neatly inside the corresponding skirt, e.g., skirt 27, and edge of the other. The sheets 1, 2 are then fixed together and flexed back to achieve a curved shape, such as a double-parabolic shape. The sheet may be made of any suitable material such as color bonded metal, metal, fiberglass, or plastic. The pair of sheet members 1, 2 can be integrally manufactured in a one piece construction as opposed to being separately formed. The sheets 1, 2 are adjustably secured by a pair of chain 4 and hook 5 retainers (only one retainer being shown because of the orientation of FIG. 3). The retaining means can be a chain, wire or like means, optionally adjustable in length. A pair of threaded bolts 6 and 7 pass down through holes 8 and 9 in the top of the assembled reflector and are secured by nuts 10 and 11.

A lamp mount 12 attaches to bolts 6 and 7 through holes 13 and 14 and is adjustably secured by attaching nuts 15 and 16. The lamp mount comprises a sliding plate that adjusts along a pair of threaded bolts which pass though holes in the sheet. Nuts are used to secure bolts to the sheet and to provide a means of adjustment for the sliding plate. The luminaire mount may be designed in any fashion, adjustable or non-adjustable, so long as it does not substantially inhibit flexibility of the sheet members when attached thereto.

The V-shaped perforated shielding device 17 slides onto the lamp fitting 18 and is secured to the underside thereof by a grub screw 19. The heat shield is preferably provided about at least part of the element or filament portion of the lighting means, and is attached via a slender arm, to a piece of cylindrical tube which slides onto the lamp fitting and is secured with a grub screw. The heat shield may be perforated with any number of holes of any size or shape so long as it is substantially V-shaped. It may be attached to the lamp fitting by any method capable of securing the shield parallel to the under side of the lamp. Folds at 20 and 21 produce rigidity and strength in the flexed and retained sheet members. The resilient reflective sheet may comprise one or any number if sheet members and any necessary reinforcing members fashioned so as to approximate the predefined shape and conditions required for formation of a flexible double parabolic shape as herein defined.

Figure 4:
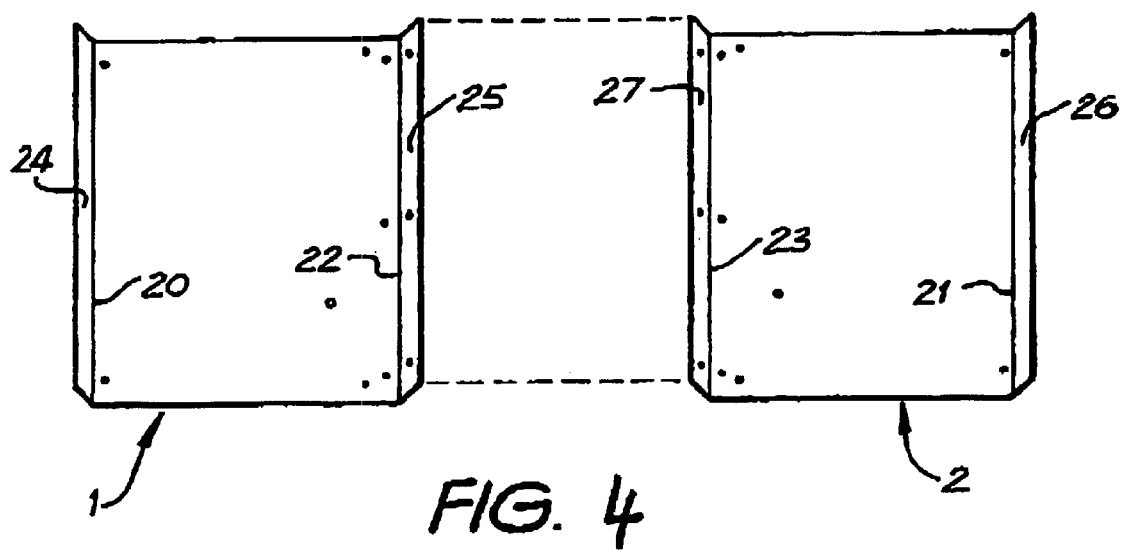
FIG. 4 shows a disassembled view of the reflector components of FIG. 3, depicting the protruding skirts, present on sheet members.

Referring to FIG. 4 it can be seen that sheet members 1 and 2 which form the reflector have two folds 20,22 and 21,23 which create associated skirts 24,25 and 26,27.

Figure 5:
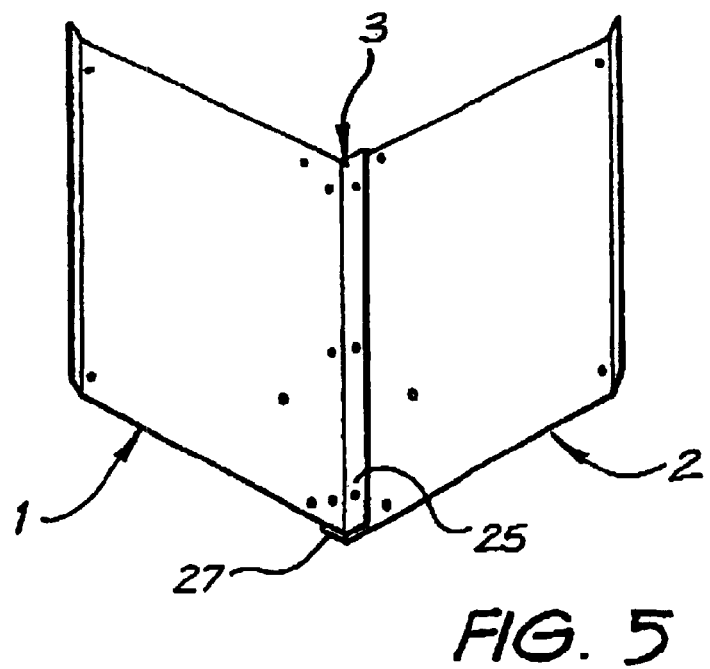
FIG. 5 shows an assembled view of the reflector components of FIG. 3 prior to flexing, depicting the alignment of the sheet members.

Referring to FIG. 5 it can be seen how sheet members 1 and 2 are joined at an angle. Skirts 27 and 25 are attached to the bodies of sheet members 1 and 2 to create a reinforced joint about the newly created spine 3.

By appropriate adjustment of the reflector device described above, many and varied desirable conditions of artificial illumination may be achieved. Hence the need to employ more than one reflector device to efficiently service a range of discrete tasks may be reduced or abolished.

It will be realized that the reflector device according to this invention is not restricted to the specific shape and construction of the resilient sheet shown in the example, but may use a sheet fashioned from one, two, or more pieces of suitable material of any suitable shape or size so long as the essential feature of being flexed back against a spine or axial crease to create an adjustable double parabolic shape or other similar shape is achieved.

Figure 6:
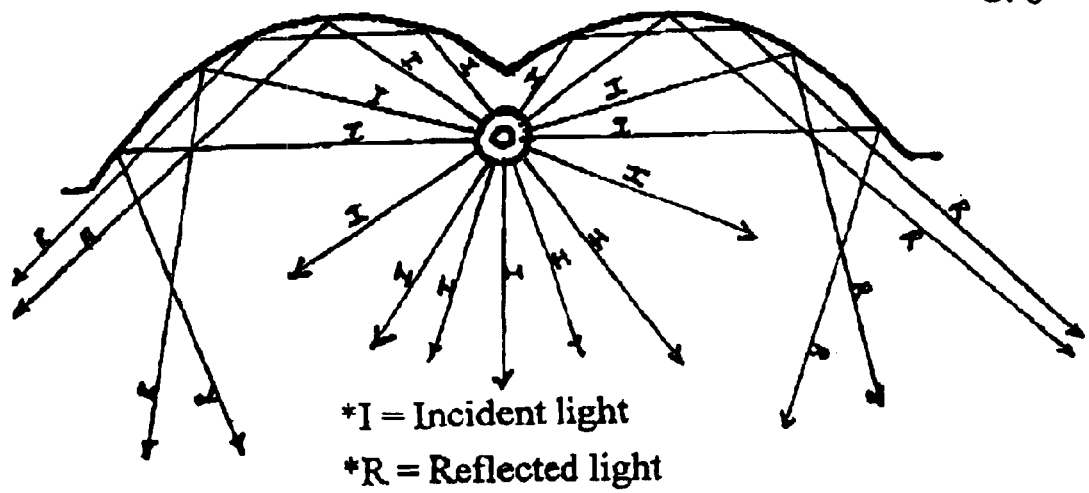
FIG. 6 illustrates the incident and reflected electromagnetic radiation when a double parabolic reflector is used without a shielding device; and, FIG. 7 illustrates a similar depiction to that of FIG. 6, but when a shielding device in accordance with the present invention is used.

Referring to FIG. 6, a double parabolic shaped reflector device is shown in cross-section, to illustrate the incident and reflected radiation associated with such a reflector from a light source positioned thereunder. Incident light I is shown being transmitted from the light source. Some of this incident light travels towards the reflector and is reflected as reflected light R, according to the general principle that the Angle of Reflection equals the Angle of Incidence. The double parabolic shaped reflector shown in FIG. 6 is a special shape so far as reflection is concerned, in that it does not reflect any heat or light back towards the light source or bulb, or create any 'left to right' or 'right to left' cross reflection, which is very inefficient.

Figure 7:
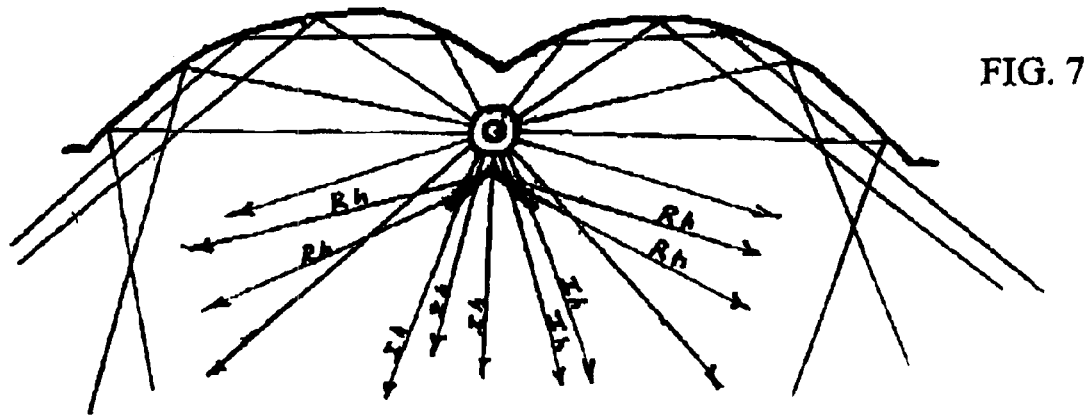

FIG. 7 illustrates a diagram similar to that of FIG. 6, but in which a shielding device 17 in accordance with the present invention is used. In the illustrated arrangement, incident light passing through the shielding device 17 is represented as $I_h$, while light reflected by the shielding device is represented as $R_h$. Using the double parabolic shaped reflector, as shown in FIG. 7, in conjunction with the shielding device 17, cannot produce any re-reflection of any substantial quantity. It is considered that re-reflection would still be minimal in the even that a non-parabolic reflector is used.

It will be appreciated by persons skilled in the art that variations and modifications may be made to the shielding device of the present invention, still achieving the functional advantages of the described embodiments. As such, variations to the shape, the nature and extent of the perforations, the means of attachment, etc., should all be considered to fall within the scope of the invention as hereinbefore described and as hereafter claimed.

What is claimed is:

1. A light fitting comprising a lamp receiving fixture having first and second opposite sides, and a reflector means, the reflector means being mounted to said first side of the lamp receiving fixture to produce a beam of light from said light fitting when said lamp receiving fixture contains and illuminated lamp, wherein said light fitting also includes a heat shield mounted to said second side of said lamp receiving fixture and in said beam of light, said heat shield having at least one surface facing said reflector means and directly receiving light from said lamp incident on said surface, each said surface being angled relative to said lamp receiving fixture to prevent light from said lamp being reflected towards said lamp and reflector means, and also having a plurality of apertures therein through which some of the light emitted by said lamp can pass.

2. The light fitting as claimed in claim 1 wherein said heat shield has a pair of said angled surfaces facing said lamp receiving fixture, said pair of surfaces having a generally V-shaped configuration.

3. The light fitting as claimed in claim 2 wherein said pair of surfaces intersect to form a ridge line, said reflector means is elongate having a longitudinal axis, and said heat shield is mounted with said ridge line substantially parallel to said longitudinal axis.

4. The light fitting as claimed in claim 3 and having a further pair of said angled surfaces facing said lamp receiving fixture.

5. The light fitting as claimed in claim 4 wherein the four surfaces of said heat shield have the configuration of a single ridged double hipped roof.

6. The light fitting as claimed in claim 1 wherein said plurality of apertures are arranged in a regular grid pattern.

7. The light fitting as claimed in claim 1 wherein said reflector means is adjustable to alter the shape of said beam.

8. The light fitting as claimed in claim 7 wherein said reflector means has a double parabolic shape.

9. The light fitting as claimed in claim 7 wherein said reflector means are formed from a pair of resilient sheets positioned one to either side of a spine in the manner of the pages of a book, said sheets in an unbiased condition lying in two intersecting planes and able to be flexed against the bias of their resilience into a doubly arched reflective surface.

10. A method of shielding a beam generated from a light fitting comprising a lamp receiving fixture having first and second opposite sides and a reflector means, the reflector means being mounted to said first side of the lamp receiving fixture to produce said beam from said light fitting when said lamp receiving fixture contains an illuminated lamp, said method comprising the step of mounting a heat shield to said second side of said lamp receiving fixture and in said beam of light, said heat shield having at least one surface facing said reflector and directly receiving light from said lamp incident on said surface, each said surface being angled relative to said lamp receiving fixture to prevent light from said light from said lamp being reflected towards said lamp and reflector means, and also having a plurality of apertures therein through which some of the light emitted by said lamp can pass.

11. The method as claimed in claim 10 wherein said reflector means is elongate and has a longitudinal axis, said heat shield comprises a pair of said angled surfaces facing said lamp receiving fixture and which intersect to form a ridge line, said method comprising the further step of mounting said heat shield with said ridge line substantially parallel to said axis.

12. The method as claimed in claim 11 wherein said reflector means is adjustable to alter the shape of said beam, said method comprising the step of adjusting the shape of said reflector so that light from said beam reflected from said heat shield is not reflected from said reflector means.

* * * * *